March 16, 1954  S. A. JONES  2,672,371
TRANSPORTATION OF SOLIDS THROUGH PIPE LINES
Filed Jan. 15, 1952  4 Sheets-Sheet 2
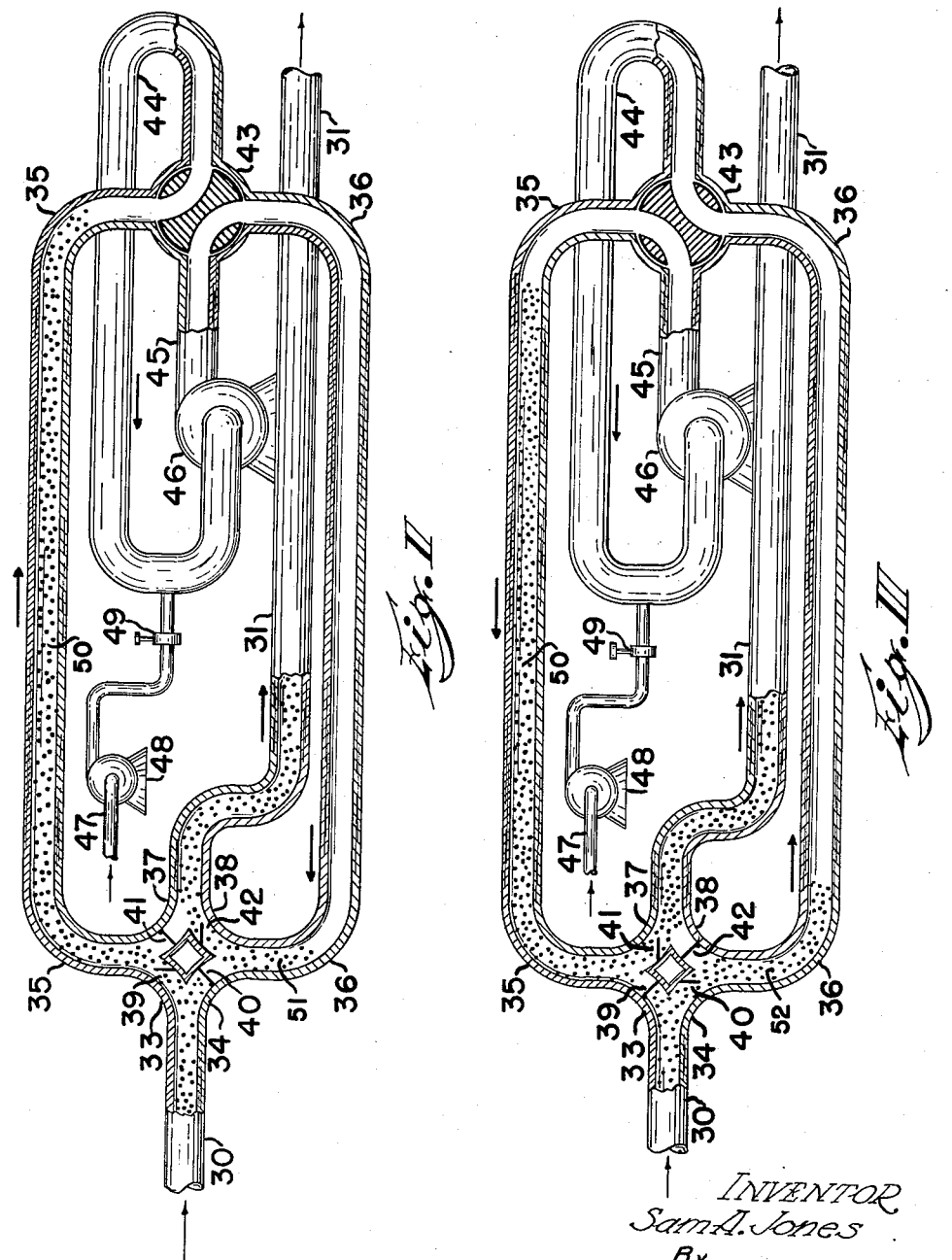

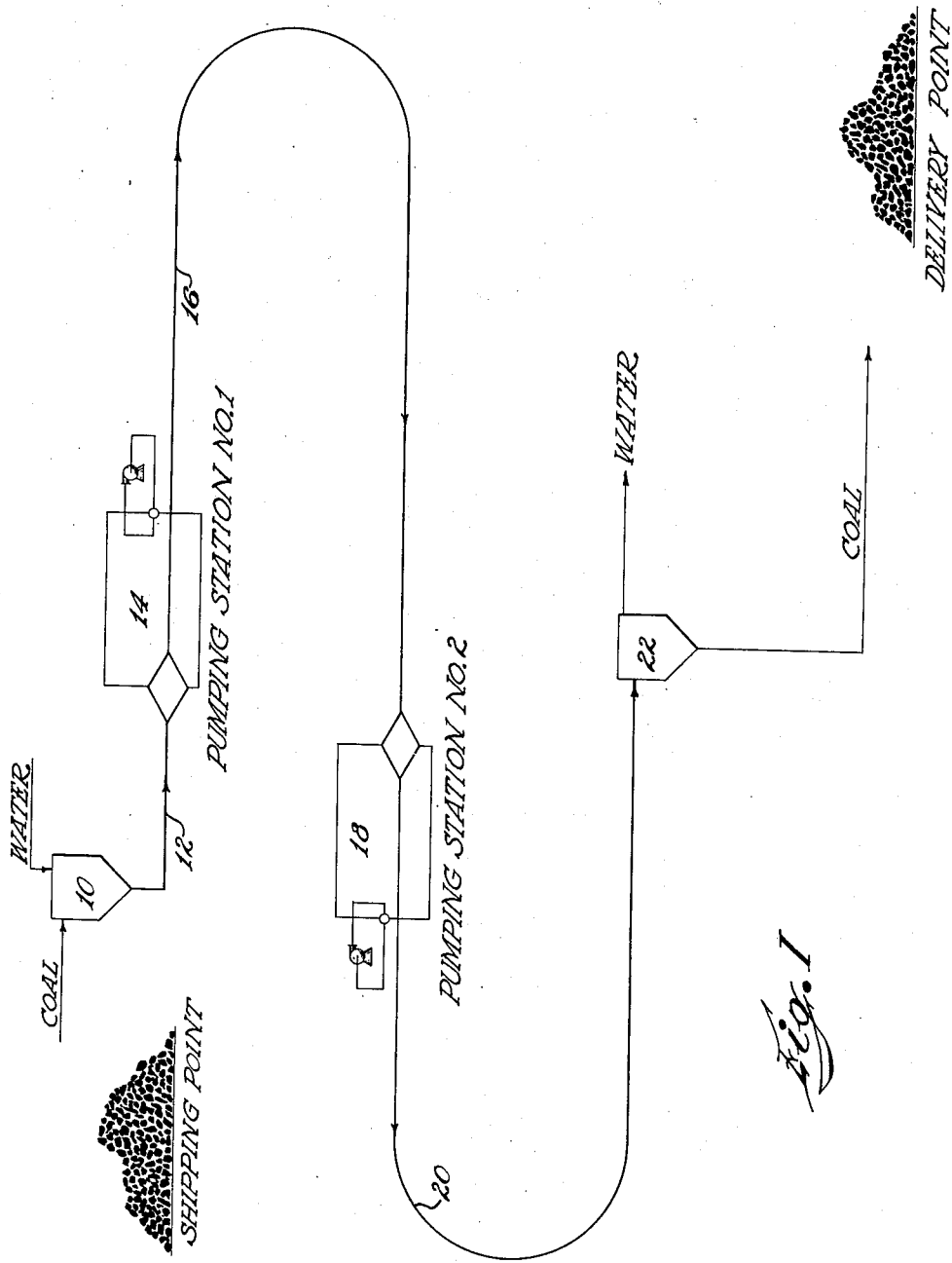

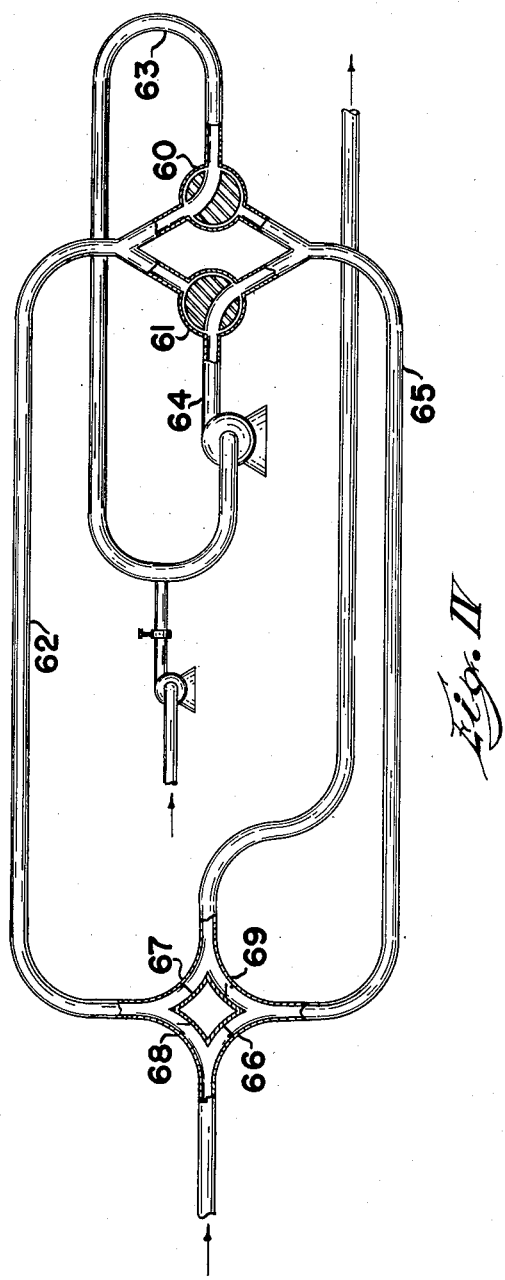

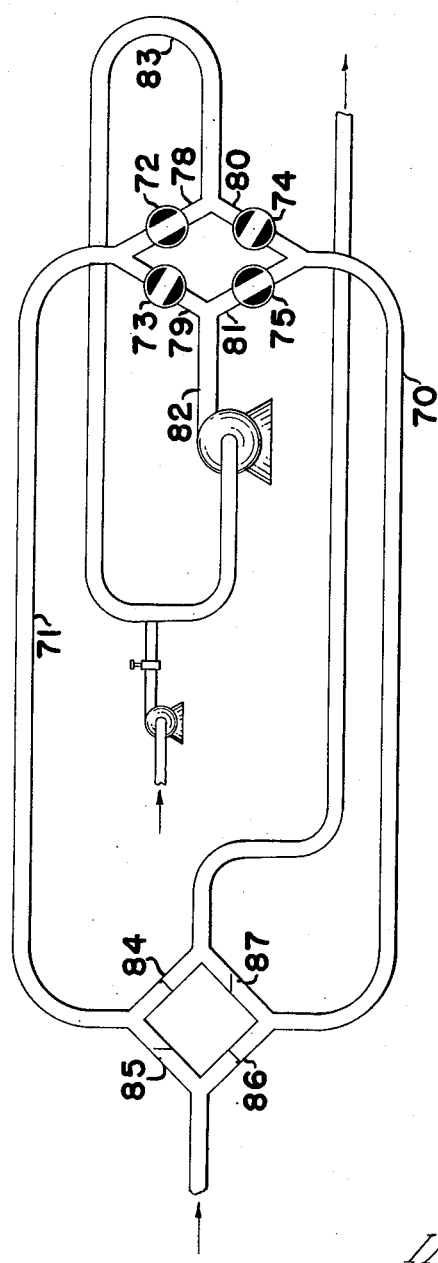
Fig. V

Patented Mar. 16, 1954

2,672,371

UNITED STATES PATENT OFFICE 2,672,371

TRANSPORTATION OF SOLIDS THROUGH PIPE LINES

Sam A. Jones, Pittsburgh, Pa., assignor to Pittsburgh Consolidation Coal Company, Pittsburgh, Pa., a corporation of Pennsylvania Application January 15, 1952, Serial No. 266,568

11 Claims. (Cl. 302—14)

This invention relates to the art of transporting solids through pipelines, and, more particularly, to the transportation of coal suspended in a liquid medium through long distance pipelines.

The transportation of coal through pipelines was long ago conceived as having attractive possibilities from the standpoint of convenience and reduced costs. Substantial effort has been directed toward commercial realization of these attractive possibilities by the use of water as a carrier for the coal. While some success has been achieved in transporting coal over short distances via pipelines, to the best of my knowledge, there exists today no coal pipeline which transports coal for distances up to one hundred miles or more.

Reference to the prior art in the field together with actual experimental studies soon establishes that there are two serious problems responsible for the previous lack of success in the development of long distance coal pipelines. The first is the tendency of the coal to settle out of suspension. Any appreciable settling out of the solids soon renders the pipeline inoperable. There exists however for each particular system a minimum flow velocity above which no appreciable particle settling occurs. But it is necessary that the flow velocity not substantially exceed this minimum velocity for otherwise the power costs of pumping coal and water will reduce the economic attractiveness of the pipeline. Furthermore, the flow of the carrier medium throughout the length of the pipeline proper should be smooth and substantially constant to minimize settling tendencies of the suspended coal.

The establishment and maintenance of this desirable condition of uniform and continuous flow at constant velocity of the carrier medium leads directly to the second and major problem, that is, the provision of a pump that is adapted to develop the high pressure head required to transfer the coal-water suspension or slurry over long distances. This pump, of which there may be a plurality over the entire length of the pipeline, must be adapted to raise the pressure head of the liquid medium without reducing the velocity of liquid flow in the pipeline for a sufficient time to permit settling to occur. Furthermore, and this is a serious limitation inherent in conventional mechanical pumps, the pump must be one which is not affected by the abrasive action of the slurry. Otherwise the potential savings of the pipeline will be largely offset by the replacement cost of the pump.

The primary object of this invention is to provide an improved pipeline system for the transportation of solids in which the solids suspended in a liquid are moved at a substantially constant velocity throughout the length of the pipeline.

Another object of the present invention is to provide an improved pumping unit for raising a liquid from one pressure level to a higher pressure level.

A further object of my invention is to provide a pumping unit for slurries in which slugs of the slurry are removed from the pipeline, raised to a higher pressure level by means of a separately pressurized recirculating liquid and reintroduced into the pipeline.

A pumping unit for the pipeline transportation of slurries of which I am a co-inventor is described in the copending U. S. patent application Serial Number 204,628, filed January 5, 1951. The pumping unit of the copending application is similar to my present unit in several respects. Both transportation systems comprise a transportation pipeline proper in which are interposed one or more pumping stations for raising the pressure of the slurry to a high level. In both systems, each pumping station includes two slurry transfer pipes which are adapted to receive periodically and alternately a predetermined quantity or "slug" of slurry from a low pressure point in the pipeline proper. Both systems are equipped with a continuously operating pressurized liquid pumping device which is adapted to deliver a predetermined quantity or "slug" of pressurized liquid to a slurry transfer pipe immediately following the receipt by that transfer pipe of a slug of slurry.

In the pumping system of the copending application, the slurry travels unidirectionally through the transfer pipes of the pumping unit, i. e., the slurry enters a transfer pipe at one end thereof and is discharged at the opposite end. The pressurized liquid similarly travels unidirectionally through the transfer pipes behind the slug of pressurized slurry.

The pumping apparatus of the present application, on the other hand, does not operate in a unidirectional manner. The slurry is introduced into one end of a slurry transfer pipe and is discharged from the same end of the transfer pipe. A reversal of the direction of flow within the transfer pipe is therefore required. Correspondingly, the pressurized liquid also enters the transfer pipe in one direction and is withdrawn in the opposite direction. This system has certain inherent advantages which make its use highly desirable as will be more fully set forth below.

For a better understanding of the present invention, its objects and advantages reference should be had to the following description and to the accompanying drawings in which:

Figure 1 is diagrammatic flow sheet of a system for transporting coal-water slurry in accordance with the present invention;

Figure 2 is a drawing, partly diagrammatic and partly cross-sectional, showing the preferred embodiment of a pumping station for elevating the pressure of the coal-water slurry;

Figure 3 is a drawing, partly diagrammatic and partly cross-sectional, of the pumping station shown in Figure 2 in a different stage of operation;

Figure 4 is a drawing, partly diagrammatic and partly cross-sectional, of a modified embodiment of the pumping station shown in Figure 2; and Figure 5 is a drawing partly diagrammatic and partly cross-sectional, of another modified embodiment of the pumping station shown in Figure 2.

Referring specifically to Figure 1 in the drawings there is shown a pipeline system for transporting coal in the form of a water slurry over distances of up to one hundred miles or more. In this system, coal and water are delivered to a slurry preparation tank 10 in which they are thoroughly mixed to form a slurry of uniform consistency. From the preparation tank the slurry is conducted through a pipeline 12 to the inlet and low pressure side of a pumping station 14. The necessary head for moving the slurry at the desired velocity is provided by this pumping station, which will be described in detail later.

From the high pressure side of the pumping station 14, slurry is conducted through a pipeline 16 to a second pumping station 18 which corresponds in design and mode of operation to the first pumping station 14. The coal-water slurry is delivered from the second pumping station 18 through a pipeline 20 to a slurry separation tank 22 from which coal is separately recovered.

The size of the coal, the concentration of the slurry, the diameter of the pipe, and the velocity of the slurry through the pipeline are suitably correlated to insure continuous movement of the coal through the entire length of the pipeline, and to obtain the desired pipeline capacity. For optimum commercial operation, the size of the coal will generally lie between 40 mesh and 3/8 inch. The concentration of the slurry is preferably between about 40 and 80 per cent by weight of solids. In general, the pipeline diameter will be of the order of 5 to 15 inches. The velocity of flow through the system is such as to insure that little or no solids settle out and will in general under the conditions given above range from 3 to 10 feet per second.

For example, with a size consist of 3/8 inch x 0 and a slurry concentration of 50 per cent in pipeline of 12 inches diameter, a velocity of about 6 feet per second should be maintained. Such a system will deliver approximately 7000 tons per day. To transport this much coal over a distance of 100 miles employing two identical pumping units requires the development of a pressure of about 1250 pounds per square inch at each pumping station.

The operation of the pumping unit will now be described with reference to Figures 2 and 3 of the drawings. Coal slurry, being transported in a pipeline 30, is pressurized by the method of my invention and reintroduced under pressure into the extension of the pipeline 31 for further transportation. Branching out from the slurry inlet pipeline 30 are two pipe sections 33 and 34 which communicate with two slurry transfer legs 35 and 36 respectively. Two other pipe sections 37 and 38 also communicate with the two slurry transfer legs 35 and 36 respectively and join to form the outlet pipeline 31. Check valves 39, 40, 41 and 42 are arranged in pipe sections 33, 34, 37 and 38 respectively to permit flow of fluids through the pipe sections only in one direction. That is, fluids will flow through conduits 33 and 34 only in a direction away from the pipeline 30; similarly fluids will flow through conduits 37 and 38 only in a direction toward pipeline 31. These check valves are further adapted to permit the flow of fluids only from the high pressure side of the valve to the low pressure side. To elaborate, the outlet pipeline 31 is always under high pressure and the inlet pipeline 30 is always under a lower pressure. The transfer legs 35 and 36 alternately under (1) a pressure greater than that in the outlet pipeline 31 and (2) a pressure lower than that in the pipeline 30. Thus, when the transfer leg 35 is under high pressure, the transfer leg 36 is under low pressure, and fluids will flow through check valves 40 and 41 but not through check valves 39 and 42. During the other half of the pumping cycle, when transfer leg 35 is under low pressure, and transfer leg 36 is under high pressure, fluids will flow through check valves 39 and 42 but not through check valves 40 and 41. The pipe sections 33, 34, 37 and 38 preferably are substantially the same diameter as the slurry pipeline proper, of which the inlet and outlet pipelines 30 and 31 are component elements.

The slurry transfer pipes 35 and 36 are substantially the same diameter as the slurry pipeline proper, although they may have a smaller diameter. Preferably the two transfer pipes are of the same length. The transfer pipes may be quite long, e. g. 100 yards, or a mile, or even longer. At the opposite end of the transfer legs, away from the slurry pipeline, the legs communicate with a motor operated four way control valve 43 at diametrically opposed valve apertures. A water pumping system communicates with the remaining two apertures of the control valve 43 by means of a low pressure water return line 44 and a high pressure water line 45. A high pressure water pump 46, adapted for continuous unidirectional operation, draws its suction flow from the low pressure water line 44, pressurizes the water and discharges pressurized water into the high pressure water line 45. The water system also is provided with a water make-up system comprising a pipe 47 leading from any convenient source of clear water to the low pressure water return line 44. A small water pump 48 is provided in the pipe 47 for pumping make-up water under the control of a valve 49.

Referring specifically to Figure 2, the pumping system is illustrated schematically at the termination of one half of the pumping cycle. The unit has been operating with the motor operated control valve 43 in the position shown, for almost one complete half-cycle. High pressure water from the high pressure water line 45 passes through the valve 43 into the slurry transfer pipe 36 which is therefore operating under elevated pressure. At the same time low pressure water from the slurry transfer pipe 35 passes into the low pressure water return line 44 through the valve 43. Under such conditions, check valves 40 and 41 are automatically closed and no fluids can flow through the pipe sections 34 or 37. Similarly the check valves 39 and 42 are automatically open and fluids may pass through the pipe sections 33 and 38.

Throughout the half cycle illustrated in Figure 2, a slug of slurry 50 has been entering the slurry transfer pipe 35 through the pipe section 33 and the open check valve 39. This slug of slurry 50, as shown, has advanced in the transfer pipe to a point just short of the motor operated four-way valve 43. Concurrently, throughout the half cycle, high pressure water from the high pressure water line 45 has been entering the other slurry transfer pipe 36 through the valve 43 and forcing a slug of slurry 51 (which had been introduced into the transfer pipe 36 during the previous half-cycle) out into the slurry pipeline proper 31 through the pipe section 38 and the open check valve 42. When the last portion of the slurry slug 51 has passed out through the pipe section 38 past the check valve 42, the motor operated control valve 43 is actuated into its other position as shown in Figure 3, which illustrates the conditions existing in the system during the other half of the pumping cycle.

With the motor operated valve 43 in the position indicated in Figure 3 which shows the conditions momentarily after the valve switching, high pressure water from the high pressure water line 45 passes through the valve 43 into the slurry transfer pipe 35. The low pressure water from transfer pipe 36 passes through the valve 43 to the low pressure water return line 44. Accordingly the check valves 39 and 42 are closed and no fluids can pass through the pipe sections 33 or 38. Similarly the check valves 40 and 41 are open and slurry can pass through pipe sections 34 and 37. Slurry from the slurry pipeline inlet 30 passes through the pipe section 34 and the check valve 40 into the slurry transfer pipe 36 which now is operating as a low pressure zone. The incoming slurry enters the transfer pipe in the form of a slug 52 under the dual force of suction from the pump suction line 44 as well as the pressure head remaining in the pipeline proper. High pressure water from water line 45 displaces the slug of slurry 50 which had been introduced into the transfer pipe 35 during the previous half-cycle and forces this slug into the pipeline proper 31 under high pressure.

The pumping stroke shown in Figure 3 continues until the newly introduced slug of slurry 52 reaches a point near the valve 43. The stroke terminates when the valve 43 returns to the position shown in Figure 2, and the next stroke begins immediately. For the proper timing of my new system, all that is necessary is that the two pumping strokes consume an identical time. Preferably this time is that required to fill a low pressure transfer pipe with slurry to a point just short of the valve 43. However, it should be evident that the system will operate effectively if, for example, low pressure slurry is introduced only to a midpoint of the low pressure transfer pipe, provided that the slurry introduced into the other transfer pipe during the next pumping stroke reaches only the corresponding point of that transfer pipe. This simple timing feature of my invention makes it possible to alter the conditions within the pipeline system such as the average velocity of the slurry transportation, without requiring delicate control over the timing of each pumping station.

Preferably, of course, the maximum use should be made of the entire length of the transfer legs by filling them as far as possible with slurry during each pumping stroke. When my system is operated accordingly, a minimum number of switching operations with the valve 43 are required, thereby reducing the wear on the moving parts of my system and increasing the useful life of the valves.

The maximum quantity of slurry which may be introduced into either of the transfer legs is limited by the necessity that no solid particles reach the valve 43 to erode the moving parts. If this limitation is satisfied, no solid particles can enter the water pumping system through the pipe 44 to cause abrasion or mechanical failure of the high pressure water pump 46. Thus the only delicate moving parts of my pumping system, to wit, the high pressure water pump and the four-way valve, are protected from contacting solids at all times.

A small amount of clear water is employed to flush out the check valves at the end of each pumping stroke. For example, in the pumping stroke shown in Figure 2, the motor operated valve 43 is not actuated to terminate the stroke until a small amount of water has followed the slug of slurry 51 through the check valve 42. This small quantity of water will appear in the slurry pipeline outlet pipe 31 which means that my pumping system discharges slightly more total fluid than is introduced into the system from the slurry inlet pipeline. Thus if both the inlet and outlet pipelines have the same diameter, the slurry transportation velocity in the pipeline proper following my pumping system will exceed that in the pipeline proper preceding my pumping system. However, with the long slurry transfer legs which are comprehended by my invention, these water slugs are relatively quite small and the difference in velocity is negligible. Make-up water from the pipe 47 is supplied to the water pumping system continuously to compensate for the small quantity of water which flows through the check valves following each pumping stroke.

It has been found that in addition to flushing out the check valves, this small quantity of water which is added to the pipeline outlet following each pumping stroke also serves to keep the entire pumping system in balance. Without the incremental water slug following the slurry slug into the pipeline outlet, each succeeding pumping stroke will terminate with the slurry slug in the low pressure transfer pipe slightly nearer to the four-way valve than that of the previous strokes, despite uniform timing of the valve switching. Thus when operated without the additional make-up water, slurry ultimately will creep into the moving parts of my system and shorten their useful life.

The slurry employed in these operations contains solid particles with a wide variation in particle size. For example, particles ranging from ⅛ inch diameter down to colloidal size would be found in a normal coal slurry transportation system. It is well known that these solids tend to drag behind the liquid slurry vehicle (water) during flow through a pipeline. It is further well-known that the larger particles will drag behind the liquid vehicle more so than the smaller particles. Probably some of the colloidal particles experience no drag effect whatsoever.

Because of the reciprocatory fashion in which my system operates, the drag effect of the solids is compensated during each pumping cycle. As slurry is introduced into one of the transfer pipes of my system, the very fine solid particles tend to travel through the transfer pipes at the same velocity as the slurry vehicle. However, the larger size particles tend to drag behind the vehicle by an appreciable distance, with the result that the slurry slug experiences considerable tailing out of the solids. When the pumping system is switched, however, the drag factor of each particle in the slurry causes a reversal of the tailing out phenomenon and the slug of slurry leaves the transfer pipe in substantially the same linear particle distribution with which it entered the system during the preceding half-cycle. Tailing out of the solids being reintroduced into the pipeline is therefore substantially nil.

One method for controlling the timing of the pumping cycle is a conventional cyclic timing device. The frequency of the valve changes will depend upon the length of the slurry transfer pipes 35 and 36 as well as upon the velocity of the slurry being transported. It is preferable that the system operate with a minimum frequency of valve changes in order to minimize valve wear. For the purposes of illustration, to provide a cycle flow through each leg of from 2 to 5 minutes, with an average slurry velocity of 3 to 10 feet per second, the length of the slurry transfer legs 35 to 36 may be between approximately 0.05 and 1 mile.

The pump employed in the pumping system of my slurry pumping apparatus may be of any convenient design. For example, a conventional centrifugal pump may be employed, in which case the timing of the valve switching operations can be accomplished by some cyclic timing device. Alternatively the valve switching can be correlated with a water discharge volume measuring device. On the other hand, the water system pump may be a constant delivery reciprocating pump, in which case the valve switching operations may be timed by correlating the number of water pumping strokes of the reciprocating pump with the volume of the transfer pipes to be filled. Thus, for example, if it is known that 500 strokes of the water pump will supply sufficient high pressure water to the transfer pipes to discharge the slurry and also flush the slurry check valves, then the valve switching apparatus may be adapted to coincide with every 500 pump stroke.

The slurry transfer pipes 35 and 36 can be parallel lengths of straight pipe as suggested by Figures 2 and 3. However, the transfer pipes also can be formed into the shape of loops with the four-way valve 43 located near to the check valve and pipe section system for control purposes. In fact the transfer pipes could even be constructed in a helical fashion under conditions requiring peculiar space considerations.

In order to increase the suction force on the slurry entering the transfer pipes, they may be elevated at a slight angle with the horizontal to provide a more positive downward flow of the slurry.

Referring to Figure 4 of the drawings, a modification of the pumping unit is disclosed in which two motor-operated, coordinated, three-way valves are employed in the recirculating water system to replace the four-way valve described in connection with Figures 2 and 3. The two three-way valves 60 and 61 are coordinated to operate together. In the position shown in Figure 4, the low pressure valve 60 permits the slurry transfer pipe 62 to communicate with the low pressure water return line 63; the high pressure valve 61 permits the high pressure water line 64 to communicate with the high pressure slurry transfer pipe 65. Accordingly, the check valves 66 and 67 are closed and the check valves 68 and 69 are open.

At the termination of the cycle shown in Figure 4, the valves 60 and 61 are switched simultaneously so that the low pressure valve 60 permits the slurry transfer pipe 65 to communicate with the low pressure water return line 63; the high pressure valve 61 concurrently permits the high pressure water line 64 to communicate with the slurry transfer pipe 62. Accordingly, the check valves 68 and 69 are closed and the check valves 66 and 67 are open. In all other respects the modification shown in Figure 4 operates similarly to that shown in Figures 2 and 3.

Figure 5 of the drawings presents a still further modification of the pumping system of my invention. This modification employs four motor-operated on-and-off valves which are operated in a coordinated manner as will be described. In the position indicated in Figure 5, the slurry transfer pipe 70 is operating as a high pressure zone and is discharging pressurized slurry into the pipeline proper. The slurry transfer pipe 71 is concurrently operating as a low pressure zone and is receiving slurry from the pipeline. Thus, the check valves 84 and 86 are closed; the check valves 85 and 87 are open. Low pressure valve 72 and high pressure valve 75 are open to permit the flow of fluids through conduits 78 and 81; valves 73 and 74 are closed and no fluids can flow through conduits 79 and 80. Accordingly, high pressure water from the high pressure water line passes into the slurry transfer pipe 70; low pressure water from the transfer pipe 71 enters the low pressure water return line 83 through the conduit 78.

At the termination of the pumping stroke indicated in Figure 5, all of the valves 72, 73, 74 and 75 are switched simultaneously so that low pressure valve 72 and high pressure valve 75 are closed, whereas high pressure valve 73 and low pressure valve 74 are open. Thus, check valves 84 and 86 are open; the check valves 85 and 87 are closed. Accordingly, high pressure water from the high pressure water line 82 enters the slurry transfer pipe 71; low pressure water from the slurry transfer pipe 70 enters the low pressure water return line 83 through the conduit 80.

The four valves 72, 73, 74 and 75 operate simultaneously and can be controlled by a cyclic timing device. In operation, the modification shown in Figure 5 corresponds in all other respects with that embodiment described in connection with Figures 2 and 3.

In the pumping unit of the above mentioned copending application Serial Number 204,628, the cycle timing feature is a delicate operation. Changes in the operating conditions of the pipeline transportation system particularly require fine control over the cycle timing. The tailing out of solids from the slurry constitutes a problem and requires the introduction of substantial slugs of clear water between slugs of slurry in order to assure that the valves employed will operate in clear water. Moreover, in the prior system the valve means at both ends of the pumping station are subjected to the erosion of slurry passing therethrough.

My present pumping system avoids these problems. Cyclic timing is not a delicate control problem with my new unit, as has been described. The operation of the present system compensates automatically for the tailing out phenomenon and permits the use of smaller slugs of clear water between slugs of slurry. Furthermore, in my new system, only clear water passes through the valve means at one end of the pumping station, eliminating completely the possibility of valve erosion by solids. Finally with my present invention, check valves can be employed exclusively in the slurry end of my unit, thereby eliminating the need for mechanically operated valves and also of course eliminating the need for providing equipment to coordinate the switching of a large number of valves simultaneously.

While the operation of the pumping station has been described in connection with the transportation of coal-water slurry, it should be understood that such a pump may be utilized wherever it is desired to elevate a fluid, whether liquid or gaseous, to a higher pressure without passing it through a mechanical pump because of corrosive, erosive or radioactive effects. In other words, the pump is adapted to be used for raising the pressure of any fluid to a higher pressure by means of a pressurized liquid without substantially altering its velocity of flow. The pump is also adapted, as will be apparent, to raise the pressure of a liquid by means of a pressurized gas instead of a pressurized liquid.

According to the provisions of the patent statutes, I have explained the principle, preferred embodiment, and mode of operation of my invention and have illustrated and described what I now consider to represent its best embodiment. However, I desire to have it understood that, within the scope of the appended claims, the invention may be practiced otherwise than as specifically illustrated and described.

I claim:

1. Pumping apparatus comprising, in combination, two transfer pipes of substantially the same length and internal diameter, a liquid pressurizing unit adapted to discharge a stream of high pressure liquid, means associated exclusively with one end of said transfer pipes for alternately diverting equal predetermined amounts of said liquid into said transfer pipes, means associated exclusively with the same end of said transfer pipes for withdrawing said liquid from said transfer pipes, whereby said transfer pipes operate at any given moment as a high pressure zone and a low pressure zone respectively, means for recirculating said withdrawn liquid to said pressurizing unit, a transportation pipeline associated exclusively with the other end of said transfer pipes, means for diverting a second liquid from said pipeline into that transfer pipe operating as a low pressure zone and means for concurrently diverting said second liquid from the high pressure transfer zone into said pipeline.

2. Pumping apparatus comprising, in combination, two transfer pipes of substantially the same length and internal diameter, a liquid pressurizing unit adapted to discharge a stream of high pressure liquid, valve means associated with one end of said transfer pipelines for alternately diverting equal predetermined amounts of said high pressure liquid into said transfer pipes, valve means associated with the same end of said transfer pipes for withdrawing said liquid at low pressure from said transfer pipes, whereby the said transfer pipes operate at any given moment as a high pressure zone and a low pressure zone respectively, means for recirculating said withdrawn liquid to said pressurizing unit, a transportation pipeline associated with the other ends of said transfer pipes, and valve means comprising four check valves for diverting a second liquid from said pipeline into that transfer pipe operating as a low pressure zone and concurrently diverting said second liquid from the high pressure transfer zone into said pipeline.

3. An apparatus for pumping slurries in pipelines comprising, in combination, a pipeline having two interposed branches of substantially the same diameter as the pipeline proper, each of said branches having two check valves disposed therein, a transfer conduit communicating at one end with each of said branches between said check valves, said transfer conduits having substantially the same diameter as the pipeline proper and being adapted to operate as a low pressure slurry receiving zone and alternately as a high pressure slurry discharging zone, valve means at the other end of said transfer conduits, a liquid pumping system having a suction pipe and a discharge pipe associated with said valve means, and means for switching said valve means at regular periods so that said discharge pipe delivers high pressure liquid into that transfer conduit operating as a high pressure zone while liquid from the other transfer conduit is delivered to said suction pipe.

4. A pumping system comprising in combination, a pipeline with two branches interposed therein, each of said branches being substantially the same internal diameter as said pipeline, conduit means including two sections directly connected to and communicating with said branches respectively at a point between the ends of said branches, said sections being of substantially the same diameter as the said pipeline, check valves disposed in each of said branches between each end thereof and the point at which the conduit sections connect therewith, valve means associated with the other ends of said conduit sections, a liquid pumping system comprising a pressurizing device having a suction pipe and a discharge pipe, said suction and discharge pipes being associated with said valve means whereby the said suction pipe communicates with one conduit section when the said discharge pipe communicates with the other, and means for periodically reversing the position of said valve means.

5. An apparatus for pumping slurries through a pipeline comprising in combination a slurry pipeline with two branches interposed, said branches having a diameter substantially the same as that of the pipeline proper, two check valves disposed in each branch, transfer conduits communicating at one end thereof with each of said branches at a point between said check valves, said transfer conduits having substantially the same length and also having a diameter substantially the same as that of the pipeline proper, said transfer conduits communicating at the other end thereof with the diametrically opposed apertures of a two-position, four-way valve, a liquid pumping system comprising a liquid pressurizing device and a suction pipe and a discharge pipe, said suction and discharge pipes communicating with the remaining two apertures of said four-way valve, and means for switching said four-way valve from one position to the other at regular time intervals.

6. An apparatus for pumping slurries through a pipeline comprising in combination a slurry pipeline with two branches interposed, said branches having a diameter substantially the same as that of the pipeline proper, two check valves disposed in each branch, a transfer conduit communicating at one end thereof with said branches at a point between said check valves, said transfer conduits having substantially the same length and having a diameter substantially that of the pipeline proper, said transfer conduits having two bifurcated branches at their other ends, a two-position, three-way valve which communicates with one of the bifurcated branches from each transfer conduit, a second two-position, three-way valve which communicates with the remaining bifurcated branches of both transfer conduits, a liquid pumping system having a liquid pressurizing device and a suction pipe and a discharge pipe, said suction pipe communicating with one of said three-way valves, said discharge pipe communicating with the other three-way valve, and means for switching said three-way valves simultaneously at regular time intervals in such manner that said suction pipe communicates with one branch of one of said transfer conduits when said discharge pipe communicates with a branch of the other transfer conduit.

7. An apparatus for pumping slurries through a pipeline comprising in combination a slurry transportation pipeline with two branches interposed, said branches having substantially the same diameter as the pipeline proper, two check valves disposed in each branch, a transfer conduit communicating at one end with each branch at a point between the said check valves, said transfer conduits being of substantially the same length and having a diameter substantially the same as that of the pipeline proper, said transfer conduits having bifurcated branches at their other ends, a liquid pumping system comprising a liquid pressurizing device and a suction pipe and a discharge pipe, said suction and discharge pipes having bifurcated branches at their ends, two on-off valves, each of which joins one bifurcated branch from a transfer conduit with one bifurcated branch from said suction pipe, two more on-off valves, each of which joins a remaining bifurcated branch from a transfer conduit with a bifurcated branch from said discharge pipe, all of said on-off valves being correlated so that one transfer conduit communicates with said suction pipe while the other transfer conduit communicates with said discharge pipe, and means for switching all of said on-off valves simultaneously at regular time intervals.

8. The method of transporting solids through a pipeline which comprises suspending the solids in subdivided form in a liquid, introducing the resulting suspension into a pipeline, substantially continuously forming discrete slugs of said suspension of predetermined and equal volume while maintaining a substantially constant velocity of the slugs, hydraulically pressurizing each of said slugs, discharging the pressurized slugs at a substantially constant velocity in a direction opposite from that of their formation, and recombining the pressurized slugs in a substantially continuous stream.

9. Pumping apparatus, comprising, in combination, two transfer pipes of substantially the same length and internal diameter, a liquid pressurizing unit adapted to discharge a stream of high pressure liquid, means associated with one end of said transfer pipes for alternately diverting equal predetermined amounts of said liquid into said transfer pipes, means associated with the same end of said transfer pipes for withdrawing said liquid from said transfer pipes, whereby said transfer pipes operate at any given moment as a high pressure zone and a low pressure zone respectively, means for recirculating said withdrawn liquid to said pressurizing unit, a transportation pipeline associated with the other end of said transfer pipes, means for diverting a second liquid from said pipeline into that transfer pipe operating as a low pressure zone, means for concurrently diverting said second liquid from the high pressure transfer zone into said pipeline, and means for introducing additional liquid to the stream of recirculating liquid.

10. The method of raising the pressure of a fluid by means of a pressurized liquid which comprises forming a confined flowing stream of said fluid at a low pressure level, forming substantially equal volume slugs of said fluid in a first transfer zone and thereafter in a second transfer zone, pressurizing said slugs of fluid by introducing a pressurized liquid into each transfer zone to displace the fluid therein while the other transfer zone is receiving a slug of said fluid, displacing said fluid slugs in a direction opposite to that of their formation, and recombining said fluid slugs into a confined flowing stream having a high pressure level.

11. The method of transferring a slurry by means of a pressurized liquid which comprises continuously recycling a stream of liquid through a pressurizing zone, directing said stream of pressurized liquid into the liquid end of an elongated transfer zone until the latter is substantially filled therewith, then diverting said stream of pressurized liquid into the liquid end of another and corresponding transfer zone until the latter is substantially filled therewith, withdrawing said liquid from the liquid end of one transfer zone while the other transfer zone is being filled and returning it to said pressurizing zone, continually repeating the alternate and successive filling in one direction and unloading in an opposite direction whereby a continuous return of said liquid from said transfer zones to said pressurizing zone is maintained, introducing a slurry into the slurry end of a transfer zone concurrently with the withdrawal of said liquid from the opposite end to fill the void otherwise established by said withdrawal, said slurry being thereafter displaced in a confined flowing stream under pressure from said slurry end of said transfer zone upon the admittance of said pressurized liquid to the liquid end thereof, maintaining the flow of slurry into and out from said transfer zones at substantially constant velocity and at sufficiently high velocity to retain the solids in suspension, and recovering the confined flowing stream of slurry separately from the recycling stream of pressurized liquid.

SAM A. JONES.

References Cited in the file of this patent
UNITED STATES PATENTS

| Number | Name | Date |
| --- | --- | --- |
| 599,658 | Lempert | Feb. 22, 1898 |
| 2,471,498 | Road | May 31, 1949 |